Patented Apr. 6, 1943

2,315,788

UNITED STATES PATENT OFFICE 2,315,788

ARYLAMINO ANTHRAQUINONE DYESTUFFS AND A PROCESS FOR THEIR MANUFACTURE

Ernst Gutzwiller, Basel, Switzerland, assignor to the firm of Sandoz Ltd., Fribourg, Switzerland No Drawing. Application December 20, 1940, Serial No. 371,049. In Switzerland December 20, 1939

4 Claims. (Cl. 260—374)

The present invention relates to new anthraquinone dyestuffs and to a process for their manufacture and represents a further development of the invention described in the U. S. Patent No. 2,101,094.

It has been found that new anthraquinone dyestuffs can be prepared by condensing aromatic amines of the general formula

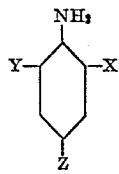

wherein X represents methyl or ethyl, Y represents methyl, ethyl or halogen and Z represents hydrogen or methyl, with such 6-halogen anthraquinone derivatives that contain in the 1- and 4-position two groups replaceable by an aromatic amine and in which the 7-position is substituted by hydrogen or halogen.

The aromatic amines useful for the production of the new anthraquinone dyestuffs are for example 1-amino-2:4:6-trimethylbenzene, 1-amino-2:6-dimethylbenzene, 1-amino-2:4-dimethyl-6-bromobenzene, 1-amino-6-ethyl-2:4-dimethylbenzene and the like.

The anthraquinone derivatives which can be used in the present process are for example 6-chloroquinizarine, 6:7-dichloroquinizarine, 1:4:6-trichloranthraquinone, 1-hydroxy-4-amino-6-chloro- or -7-chloro- or 6:7-dichloroanthraquinone and the leuco-derivatives of these compounds.

The condensation of the anthraquinone derivatives with the aromatic bases of the above cited configuration is generally carried out in presence of a solvent and a catalyst at temperatures between 50° and 250° C., and in an open or in a closed vessel. As suitable solvents the following ones, or mixtures thereof, can be used: water, ethanol, methanol and other aliphatic alcohols, chlorobenzene, nitrobenzene, dimethylaniline, phenol, glacial acetic acid and the o-o-disubstituted bases themselves when they are used in excess.

As catalyst generally boric acid or finely divided copper or copper salts may be used, but it is also possible to carry out the condensation in absence of such a catalyst.

Sometimes it is advantageous to carry out the condensation in an inert atmosphere, for example in nitrogen or carbon dioxide atmosphere, preferably under addition to the reaction mixture of acid binding agents, such as sodium-, potassium- or ammonium-acetate, sodium- or potassium-carbonate or -bicarbonate, soap and the like.

In order to prepare water soluble dyestuffs from water-insoluble condensation products the latter are sulphonated with sulphuric acid or fuming sulphuric acid of appropriate concentration of $SO_3$ or with chlorosulphonic acid, whereby one or more sulphonic acid groups may be introduced into the molecule.

The dyestuffs prepared according to the present process are valuable acid dyestuffs dyeing wool and natural silk fast blue tints showing a greenish shade in the artificial light.

The following examples, without being limitative, illustrate the present invention, the parts being by weight:

Example 1

10 parts of 6-chloroquinizarine, 15 parts of leuco-6-chloroquinizarine, 75 parts of mesidine, 25 parts of glacial acetic acid and 7.5 parts of boric acid are stirred in an inert atmosphere at 90–140° C. until the condensation is completed. The reaction mass is then poured into 500 parts of water and 100 parts of hydrochloric acid, boiled up and filtered. The base thus obtained and purified by crystallisation is then dried and sulphonated with weak oleum, whereby a water soluble dyestuff dyeing wool and silk greenish blue shades is obtained. It corresponds to the formula:

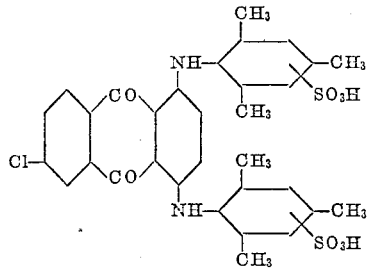

By replacing the 6-chloroquinizarine (or its leuco-derivative) by 6-bromoquinizarine (or its leuco derivative) the respective brominated dyestuff will be obtained which dyes wool similar shades.

Example 2

20 parts of 1:4:6-trichloranthraquinone, 18 parts of potassium-acetate, 0.1 part of copper powder and 70 parts of mesidine are stirred at 160–180° C. until a test in benzene does not become bluer. The base is then isolated by pouring the reaction mixture into ethanol and sulphonated as above described. A dyestuff will be obtained which is identical to the dyestuff of Example 1.

Example 3

10 parts of 6:7-dichloroquinizarine, 15 parts of leuco-6:7-dichloroquinizarine, 75 parts of mesidine, 25 parts of glacial acetic acid and 7.5 parts of boric acid are stirred in an inert atmosphere at 90–140° C. until the condensation is terminated, and the formed base is isolated in the manner described in Example 1. On sulphonation with weak oleum a water soluble dyestuff dyeing wool and silk greenish blue shades of excellent fastness properties will be obtained. It possesses the formula:

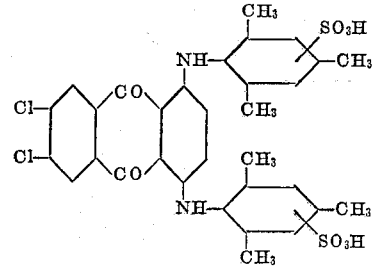

The same dyestuff will be obtained by condensing mesidine in the manner described in Example 2 with the corresponding quantity of 1:4:6:7-tetrachlor-anthraquinone and sulphonating the base. If anthraquinone derivatives containing in the 6 and 7 positions different halogen atoms are used, the respective dihalogenated bases and dyestuffs will be obtained.

*Example 4*

10 parts of 6-chloroquinizarine, 15 parts of leuco-6-chloroquinizarine, 75 parts of vic-m-xylidine, 25 parts of glacial acetic acid and 7.5 parts of boric acid are condensed and worked up in the manner described in Example 1. The base thus obtained is then sulphonated with weak oleum and yields a dyestuff dyeing wool and silk blue shades of excellent fastness properties. It possesses the following formula:

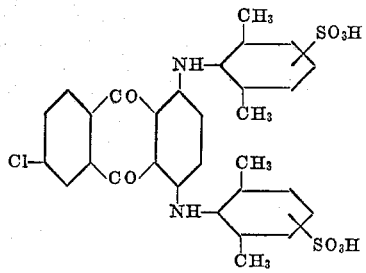

*Example 5*

10 parts of 6-chloroquinizarine, 15 parts of leuco-6-chloroquinizarine, 85 parts of 1-amino-2:4-dimethyl-6-chlorobenzene, 25 parts of glacial acetic acid and 8 parts of boric acid are condensed at 90–160° C. in the manner described in Example 1 and sulphonated with weak oleum. The dyestuff thus obtained dyes wool blue shades having excellent fastness properties. It corresponds to the formula:

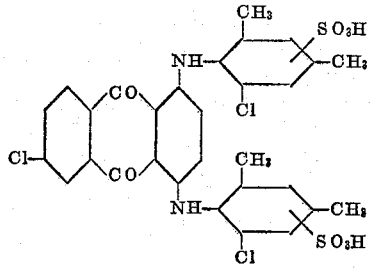

What I claim is:
1. The anthraquinone dyestuffs of the general formula:

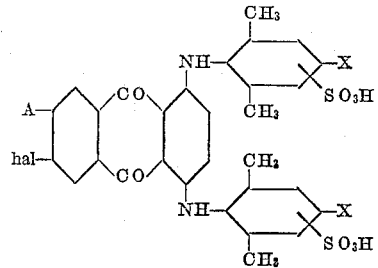

wherein hal stands for a member of the group consisting of chlorine and bromine, A stands for a member of the group consisting of hydrogen, chlorine and bromine and X stands for a member of the group consisting of hydrogen and methyl, said dyestuffs being valuable compounds for dyeing wool and silk in fast blue shades.

2. The anthraquinone dyestuff of the formula

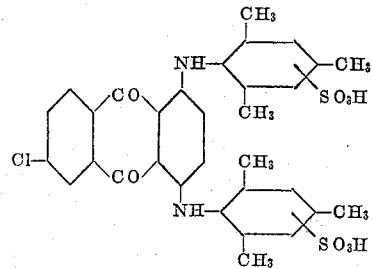

which dyes wool and silk greenish blue fast shades.

3. The anthraquinone dyestuff of the formula

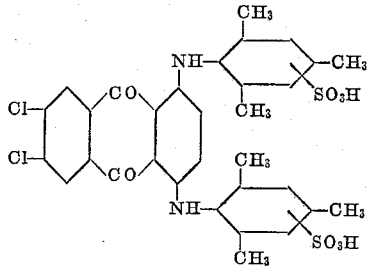

which dyes wool and silk greenish blue shades of excellent fastness properties.

4. The anthraquinone dyestuff of the formula

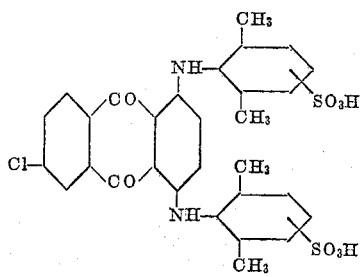

which dyes wool and silk blue shades.

ERNST GUTZWILLER.